United States Patent [19]

Makabe et al.

[11] Patent Number: 4,465,003
[45] Date of Patent: Aug. 14, 1984

[54] ELECTRONIC SEWING MACHINE WITH VOCAL INSTRUMENTALITIES

[75] Inventors: Hachiro Makabe, Kanagawa; Takeshi Kongoh, Tokyo, both of Japan

[73] Assignee: Janome Sewing Machine Co., Ltd., Tokyo, Japan

[21] Appl. No.: 558,384

[22] Filed: Dec. 5, 1983

Related U.S. Application Data

[63] Continuation of Ser. No. 489,612, May 3, 1983, abandoned.

[30] Foreign Application Priority Data

May 6, 1982 [JP] Japan ................................. 57-74623

[51] Int. Cl.³ .............................................. D05B 3/02
[52] U.S. Cl. ............................. 112/158 E; 112/121.11; 381/51
[58] Field of Search ........... 112/158 E, 158 F, 121.11, 112/121.12, 275, 277; 381/51

[56] References Cited

U.S. PATENT DOCUMENTS

4,276,444  6/1981  Tanimoto et al. .................... 381/51
4,301,753  11/1981  Meier ........................... 112/158 E X
4,375,329  3/1983  Park ................................. 381/51 X Primary Examiner—Peter P. Nerbun
Attorney, Agent, or Firm—Michael J. Striker

[57] ABSTRACT

The invention is to provide an electronic sewing machine which is improved in operation by incorporating lighting indication and vocal instrumentalities for making the operation instruction recognizable during operation of the sewing machine and giving parameters of operating instruction in accordance with issued voice, instead of depending upon electronic memories which store many kinds of patterns for lighting indication of required function.

7 Claims, 4 Drawing Figures

FIG_1
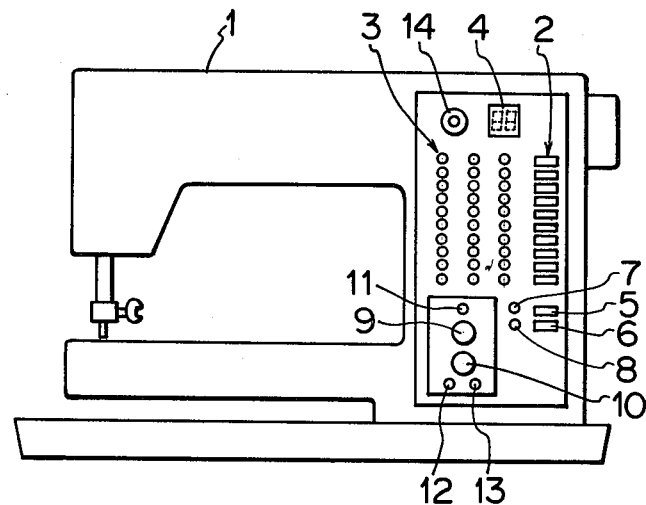
FIG_2
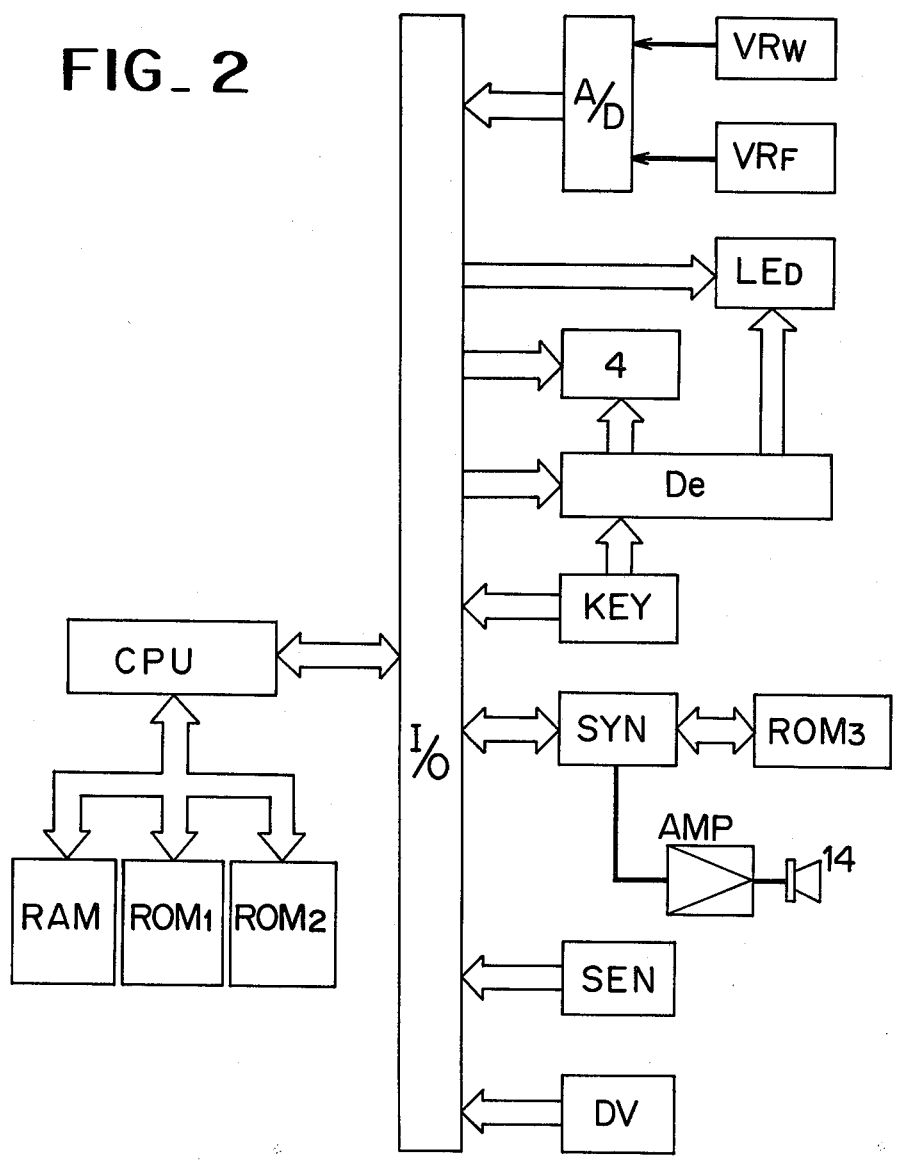

FIG_3(A)

(1) Start  (2) Input of key  (3) Key input OK
(4) Ten-key  (5) 2nd figure  (6) Ten-key → Code
(7) Cancel, addition of word  (8) Lighting indicator
(9) Pattern → vocal code  (10) Output of voice

(11) Input of key

(12) Memory key

(13) Flag set of one figure

(14) "PATTERN IS CHANGED" → Vocal code

(15) "CANCEL, ADDITION OF PATTERN IS OK" → Vocal code

(16) Output of voice

(17) Pointer 1 and its pattern → Vocal code

(18) Pointer preset

(19) Pattern → vocal code

(20) Output of voice

(21) Final pointer

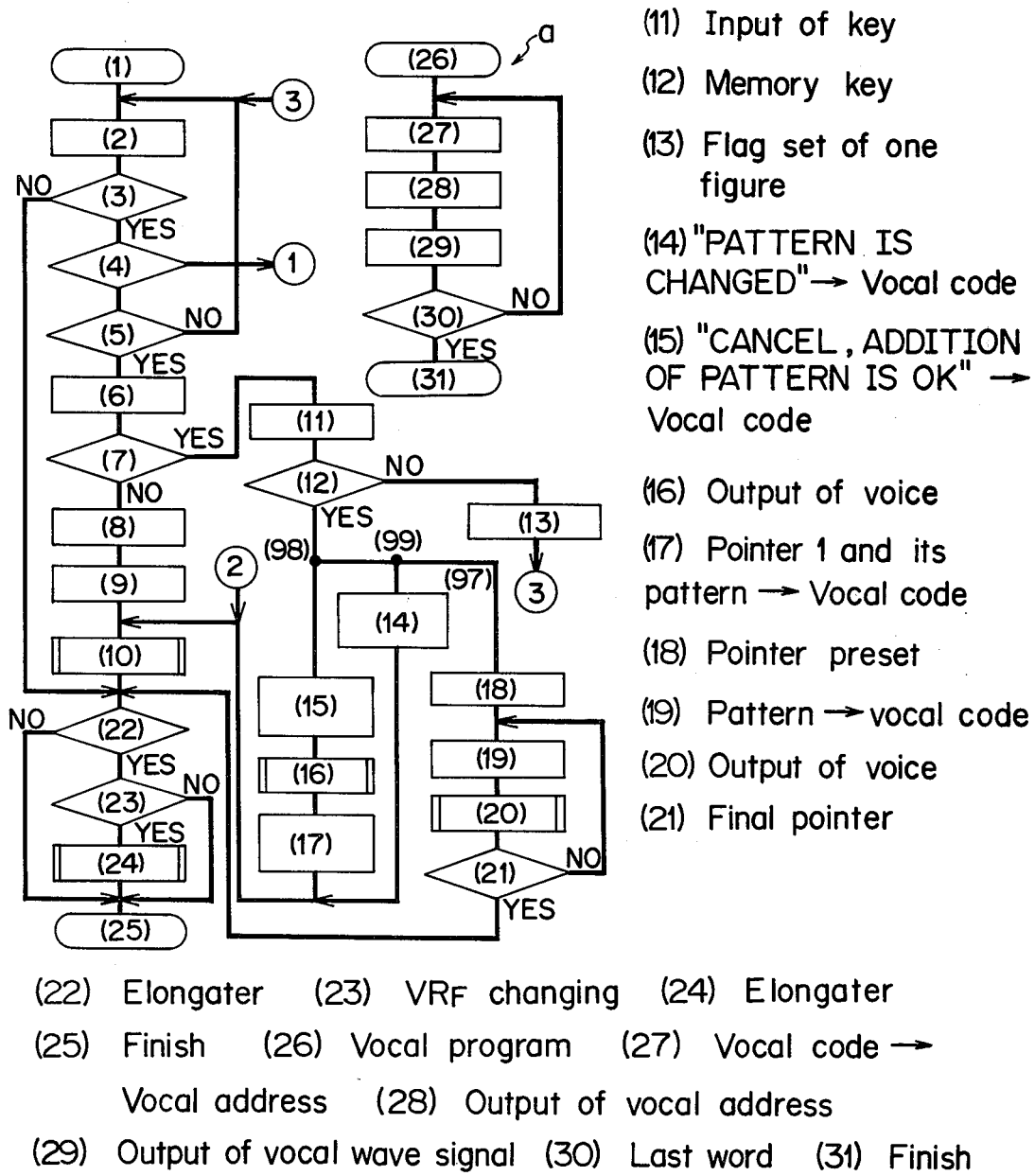

(22) Elongater  (23) VRF changing  (24) Elongater
(25) Finish  (26) Vocal program  (27) Vocal code → Vocal address  (28) Output of vocal address
(29) Output of vocal wave signal  (30) Last word  (31) Finish

FIG. 3(B)

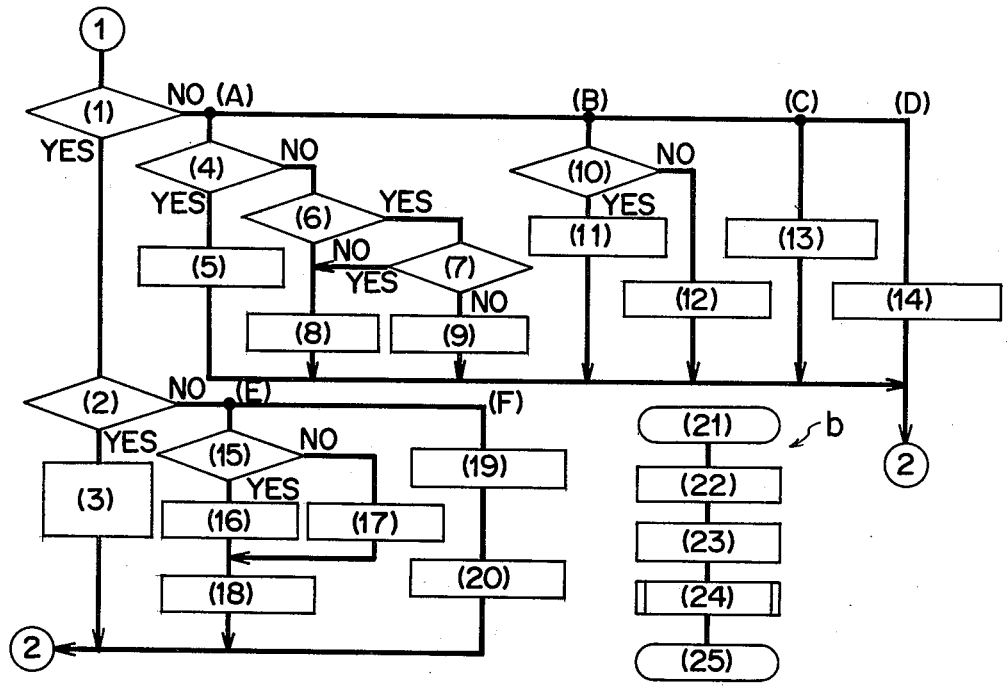

(1) Memory editing mode   (2) Controller ON
(3) "NOT STITCHING MODE" → Vocal code
(4) Preceding AUTO   (5) "FEED MANUAL" → Vocal code
(6) Satin   (7) Preceding elongater   (8) "FEED AUTO → Vocal code   (9) "ELONGATER" → Vocal code
(10) Preceding AUTO   (11) "AMPLITUDE MANUAL" → Vocal code
(12) "AMPLITUDE AUTO" → Vocal code   (13) "MEMORY" → Vocal code   (14) "CANCELLED" → Vocal code
(15)(16) Addition of pattern   (17) Pointer count-up
(18) Pointer and pattern → Vocal code   (19) Cancel memory content of pointer position   (20) Cancel of pattern → Vocal code
(21) Elongater program   (22) Division into 5 steps
(23) "MAGNI. 1 TO 5" → Vocal code
(24) Output of voice   (25) Finish
(A) FEED   (B) AMPLITUDE   (C) MEMORY
(D) CANCEL   (E) MEMORY   (F) CANCEL

ELECTRONIC SEWING MACHINE WITH VOCAL INSTRUMENTALITIES

CROSS-REFERENCE TO A RELATED APPLICATION

This application is a Rule 60 continuation of application Ser. No. 489,612 filed May 3, 1983 now abandoned.

BACKGROUND OF THE INVENTION

The invention relates to an electronic sewing machine, and more particularly to vocal instrumentalities which issue electronic composite voice as parameter with respect to operations and indications for selecting patterns to be stitched.

A conventional electronic sewing machine has been incorporated with memories of small type which enable to store a plurality of patterns and an order of generating the patterns, control shapes of the patterns, and so on. However, if the sewing machine has been multi-functioned, an operation is complicated accordingly so that the machine operator makes errors in handling operational sequences or others.

The present invention has been developed to avoid disadvantages of the prior art.

SUMMARY OF THE INVENTION

The objects of the invention are attained by a pattern selecting means including a plurality of pattern selecting switches each operated to select a pattern to be stitched; indicating means including a plurality of lamps each selectively lighted to indicate a pattern selected by a pattern selecting switch; stitch forming means for producing a selected pattern of stitches, including a needle vertically and laterally reciprocated to penetrate a fabric to be stitched and a fabric feeding device for transporting the fabric relative to the needle; operating means for the functions of the sewing machine including an operating element operated to adjust a lateral swinging movement of the needle and an operating element operated to adjust a fabric feeding amount; a central processing unit having memory means memorizing logic signals for selectively effectuating the function operating means of the sewing machine under a control of predetermined program; voice address generating means for cooperating with the central processing unit, said voice address generating means being provided with the logic circuits of voice codes for generating the instructions of voice with respect to the manipulations of the operating means and the results thereof in a predetermined order; memory storing voice parameters which are to be read out when addressed by the voice address generating means; voice synthesizing means for synthesizing the voice parameters read out from the memory to thereby generate voice wave signals; speaker means receiving the voice wave signals to announce the instructions of voice with respect to the manipulations of the generating means and the results thereof in a predetermined order.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is an outlined view of a sewing machine revealing an embodiment of the invention;
FIG. 2 is a block diagram of a control circuit; and
FIGS. 3-A and 3-B are control flow charts.

DETAILED DESCRIPTION OF THE PREFERRED EMBODIMENT

An embodiment of the invention will be explained in reference to the attached drawings. A machine body 1 is, as shown in FIG. 1, provided with pattern select switches 2, pattern indicators 3, a numeral figure indicator 4, a memory switch 5, a cancel switch 6, indicators 7, 8, a needle amplitude adjuster 9, a fabric feed adjuster 10, and lighting indicators 11, 12, an elongate indicator 13 and a speaker 14. The pattern select switches 2 constitute a ten-key. The pattern indicator 3 indicator 3 indicates by lighting pattern index to be selected by said pattern select switch 2 and the selected pattern together with the pattern number. The numeral indicator 4 indicates the number of the selected pattern in two figures, and the instant embodiment shows 30 patterns in the pattern indicator 3. The memory switch 5 is operated together with the pattern select switch 2, and is to store the plurality of the patterns in the memory. The cancel switch 6 cancels the function of the memory switch 5. The indicators 7,8 indicate operations of these switches 5, 6. The needle amplitude adjuster 9 and the fabric feed adjuster 10 are served by their pushing operation, and the amount of the former and the amount of the latter are each controlled by their rotating operation, and when further operations are made, preceding operations are returned to the automatic set of said selected patterns. The lighting indicators 11, 12 indicate that the function of their adjusters are effective.

In the sewing machine of the present embodiment, groups comprising the pattern indicators 3 are used as a satin pattern. When the satin pattern is selected, the fabric feed adjuster is worked as an elongater, and in this case when the fabric feed adjuster 10 is operated in the first operation and the feed of the pattern is controlled, the adjusting value of the first operation is locked by the pushing operation of the second operation. By this operation of the feed adjuster 10, magnification of enlargement of the elongater in the fabric feed direction can be controlled 1 time to 5 times. Then the elongater indicater 13 is lighted together with the indicator 13. The speaker 14 is for informing in voice an indication, alarm, caution or erroneous operation in relation with each of said operating parts and the indicating parts.

FIG. 2 is a block diagram of a control circuit incorporated in the machine body 1. The structure of the ordinary stitching function follow the contents of Japanese patent application No. 145,280/78 by the same applicants. A brief explanation will be made. A read-only-memory ($ROM_1$) stores stitch control signals, and the other ready-only-memory ($ROM_2$) stores program control signal for forming stitches in accordance with stitch control signals read out from the memory ($ROM_2$), conducting ordinary functions of the sewing machine, and conducting functions relating to a later mentioned issue of voice. A central processing unit (CPU) carries out the program control basing on each of program control signals. A random access memory (RAM) temporarily stores process and result of each of the programs. (I/O) is an input-output port. A key (KEY)

matrix which is designated by pushing the
2, 3, 5, 6 of the adjusters 9, 10 and is read out by
3, 7, 8, 11, 12, 13 shown by the indicator
is a decoder (D6), and indicates the
controlled by numeral V variable V
digital transformer into digital value
by rotation of the adjusters (VR$_W$) (VR$_F$)
thereof are changed into digital va
central processing unit (CPU) to
analog-digital transformer (A/D)
rotation phase of the
timing of tern, "FEED AUTO" is voiced as i
of the needle amplitude adjuster
tern and is not the pres
"ELONGATOR"
variable various applications without omitting features that, from the standpoint of prior art, fairly constitute essential characteristics of the generic or specific aspects of this invention.

What is claimed as new and desired to be protected by Letters Patent is set forth in the appended claims:

1. An electronic sewing machine comprising pattern selecting means including a plurality of pattern selecting switches each operated to select a pattern to be stitched; indicating means including a plurality of lamps each selectively lighted to indicate a pattern selected by a pattern selecting switch; stitch forming means for producing a selected pattern of stitches including a needle vertically and laterally reciprocated to penetrate a fabric to be stitched and a fabric feeding device for transporting the fabric relative to the needle; operating means for the functions of the sewing machine including a first operating element operated to adjust a lateral swinging movement of the needle and a second operating element operated to adjust a fabric feeding amount; a central processing unit having memory means memorizing logic signals for selectively effectuating the function operating means of the sewing machine under a control of a predetermined program; voice address generating means for cooperating with the central processing unit, said voice address generating means being provided with the logic circuits of voice address codes for generating the instructions of voice with respect to the manipulations of the operating means and the results thereof in a predetermined order; memory storing voice parameters which are to be read out when addressed by the voice address generating means; voice synthesizing means for synthesizing the voice parameters read out from the memory to thereby generate voice wave signals; speaker means receiving the voice wave signals to announce the instructions of voice with respect to the manipulation of the operating means and the results thereof in a predetermined order.

2. An electronic sewing machine as defined in claim 1, wherein said operating means further include a third operating element (5) which is operated to indicate through the speaker means that the patterns selected by the pattern selecting switches have been memorized in a pattern editing mode.

3. An electronic sewing machine as defined in claim 2, wherein said operating means further includes a fourth operating element (6) operated to indicate through the speaker means that any of the memorized patterns have been cancelled.

4. An electronic sewing machine as defined in claim 3, wherein a key word (99) may be designated to indicate through the speaker means that the memorizing operation of the selected patterns has been finished in the pattern editing mode.

5. An electronic sewing machine as defined in claim 4, wherein a key word (98) may be designated, after the memorizing operation of the selected patterns has been finished, in the pattern editing mode, to indicate through the speker means that the finished condition of the pattern memorization has been released again to allow the machine operator to cancel any of the memorized patterns or to further memorize a desired pattern.

6. An electronic sewing machine as defined in claim 5, wherein a key word (97) may be designated to confirm through the speaker means that the selected patterns have been memorized in a desired pattern editing mode.

7. An electronic sewing machine as defined in claim 1, having a starting controller and further compising means operated in association with the machine starting controller operated during the pattern editing mode of the sewing machine, to indicate through the speaker means that the sewing machine is not yet set for starting the stitching operation.

* * * * *